(12) United States Patent
Olarig

(10) Patent No.: US 11,656,774 B2
(45) Date of Patent: *May 23, 2023

(54) MULTI-MODE NVME OVER FABRICS DEVICE FOR SUPPORTING CAN (CONTROLLER AREA NETWORK) BUS OR SMBUS INTERFACE

(71) Applicant: Samsung Electronics Co., Ltd., Suwon-si (KR)

(72) Inventor: Sompong Paul Olarig, Pleasanton, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

This patent is subject to a terminal disclaimer.

(21) Appl. No.: 17/236,934

(22) Filed: Apr. 21, 2021

(65) Prior Publication Data

US 2021/0240373 A1    Aug. 5, 2021

Related U.S. Application Data

(63) Continuation of application No. 16/431,539, filed on Jun. 4, 2019, now Pat. No. 11,016,682, which is a continuation of application No. 15/615,729, filed on Jun. 6, 2017, now Pat. No. 10,338,838.

(60) Provisional application No. 62/476,557, filed on Mar. 24, 2017.

(51) Int. Cl.
 *G06F 3/06*    (2006.01)
 *G06F 13/40*   (2006.01)
 *G06F 13/42*   (2006.01)

(52) U.S. Cl.
 CPC ......... *G06F 3/0634* (2013.01); *G06F 3/0607* (2013.01); *G06F 3/0679* (2013.01); *G06F 13/4063* (2013.01); *G06F 13/4282* (2013.01)

(58) Field of Classification Search
 None
 See application file for complete search history.

(56) References Cited

U.S. PATENT DOCUMENTS

| | | | |
|---|---|---|---|
| 7,913,012 B2 | 3/2011 | Piasecki et al. |
| 8,478,916 B2 | 7/2013 | Asnaashari |
| 8,683,460 B2 | 3/2014 | Eisenhauer et al. |
| 8,799,527 B2 | 8/2014 | Mullins et al. |
| 8,924,600 B2 | 12/2014 | Alley et al. |
| 9,454,329 B2 | 9/2016 | Cox et al. |
| 9,471,519 B2 | 10/2016 | Glickman |
| 9,524,108 B2 | 12/2016 | Hia et al. |
| 2004/0164170 A1 | 8/2004 | Krygier et al. |
| 2008/0244129 A1 | 10/2008 | Tsai |
| 2009/0157929 A1 | 6/2009 | Pigott et al. |
| 2010/0293303 A1 | 11/2010 | Choi |

(Continued)

FOREIGN PATENT DOCUMENTS

CN    103682898 A    3/2014

*Primary Examiner* — Kaushikkumar M Patel
(74) *Attorney, Agent, or Firm* — Lewis Roca Rothgerber Christie LLP

(57) ABSTRACT

A memory device is configured to communicate with one or more external devices, the memory device including a configurable bit or a mode select pin for determining which one of two or more different communication protocols that the memory device uses to communicate with the one or more external devices, wherein the two or more different communications protocols include at least a Controller Area Network (CAN) protocol and a System Management Bus (SMBus) protocol.

20 Claims, 2 Drawing Sheets

(56) References Cited

U.S. PATENT DOCUMENTS

| | | |
|---|---|---|
| 2013/0232376 A1 | 9/2013 | Cudak et al. |
| 2015/0160886 A1 | 6/2015 | Hoglund et al. |
| 2015/0373115 A1 | 12/2015 | Breakstone et al. |
| 2016/0026596 A1 | 1/2016 | Klein |
| 2016/0026602 A1 | 1/2016 | Narayana et al. |
| 2016/0231939 A1 | 8/2016 | Cannata et al. |
| 2016/0259597 A1 | 9/2016 | Worley et al. |
| 2016/0321200 A1 | 11/2016 | Long et al. |
| 2016/0328347 A1 | 11/2016 | Worley et al. |
| 2016/0335220 A1 | 11/2016 | Breakstone et al. |
| 2017/0040057 A1 | 2/2017 | Cho et al. |
| 2017/0300445 A1 | 10/2017 | McKnight |
| 2017/0357609 A1 | 12/2017 | Long et al. |
| 2018/0251103 A1 | 9/2018 | Satterthwaite et al. |

MULTI-MODE NVME OVER FABRICS DEVICE FOR SUPPORTING CAN (CONTROLLER AREA NETWORK) BUS OR SMBUS INTERFACE

CROSS-REFERENCE TO RELATED APPLICATION(S)

This application is a Continuation of U.S. patent application Ser. No. 16/431,539, filed on Jun. 4, 2019, now U.S. Pat. No. 11,016,682, which claims priority to, and the benefit of, U.S. Continuation application Ser. No. 15/615,729, filed Jun. 6, 2017, now U.S. Pat. No. 10,338,838, which claims priority to, and the benefit of, Provisional Application No. 62/476,557, filed on Mar. 24, 2017 in the United States Patent and Trademark Office, the entire contents of both of which are incorporated herein by reference.

BACKGROUND

1. Field

Some embodiments of the present disclosure relate generally to memory devices, and to memory device communication.

2. Description of the Related Art

Non-volatile memory over Fabrics (NVMe-oF) is a new disruptive industry standard. The NVMe-oF standards do not specify the form factor, although applied form factors may be based on 2.5" small form factor (SFF). That is, the form factor may be similar to standard solid state drive (SSD)/hard disk drive (HDD) form factors (e.g., 2.5" and 3.5" form factors). NVMe-oF devices are intended to be used mostly in enterprise or in datacenter products. However, the existing industry standard currently fails to address how to implement or optimize SSDs for specific applications, such as machine learning applications or data mining applications. Additionally, in using multiple memory devices, customers may use different memory drives from different vendors. Accordingly, the different memory drives may have different NAND profiles.

Ethernet SSD (eSSD) technology is continuing to be developed. Implementation of eSSD technology may use standard connections and interface protocols. eSSD technology may use a system management bus (SMBus), which is defined for manageability and other functionality, for communication operations. However, an SMBus is a single-ended simple two-wire bus for the purpose of lightweight communication, and is typically used for simple communications over relatively short distances (e.g., in a computer motherboard for communicating with a power source regarding instructions to turn the computer on or off). That is, SMBus technology is workable only when communications occur between two endpoints that are relatively close (e.g., under two to three feet, depending on the speed). Accordingly, SMBus technology may be inapplicable to certain technologies requiring communication across greater distances. For example, to have effective communication between sensors and a computer/processor in an automobile, communication links that extend a length of ten meters or more may be used.

In contrast to SMBus technology, Controller Area Network (CAN) is a multi-master serial bus standard protocol that uses an electronic bus line for connecting Electronic Control Units (ECUs) (e.g., systems and sensors), which may be referred to as nodes, to provide an alternative to conventional multi-wire looms. Two or more nodes are required on the CAN network to communicate, the nodes being connected to each other through a two-wire bus. The wires are a 120-ohm, nominal twisted pair of wires. The complexity of the node can range from a simple I/O device to an embedded computer/processor with a CAN interface and with sophisticated software. The node may also be a gateway allowing a standard computer to communicate over a USB or Ethernet port to the devices on a CAN network.

CAN has quickly gained acceptance in the automotive and aerospace industries, possibly because alternatives such as Peripheral Component Interconnect Express (PCI-e) buses are both more expensive, and may not operate in an acceptable manner under certain conditions that may be experienced in automobile and aerospace operating environments. CAN allows automotive components to communicate reliably on a single or dual-wire networked data bus at data rates of up to 1 Mbps.

Data usage in, and the electronic contents of, automobile and aerospace industries, such as electric vehicles and self-driving vehicles, are growing rapidly. Accordingly, there may be a market demand for next generation eSSDs (e.g., Non-Volatile Memory Express (NVMe) Over Fabrics) devices to support both automobile and aerospace markets.

SUMMARY

Some embodiments provide an improved memory device that is capable of performing communications with one of two or more communication protocols.

According to some embodiments, there is provided a memory device that is configured to communicate with one or more external devices includes a configurable bit or a mode select pin for determining which one of two or more different communication protocols that the memory device uses to communicate with the one or more external devices, wherein the two or more different communications protocols include at least a Controller Area Network (CAN) protocol and a System Management Bus (SMBus) protocol.

The memory device may further include an Ethernet solid state drive (eSSD).

The memory device may further include a multiplexer (MUX) that is configured to be controlled by the mode select pin or configurable bit to select which one of the two or more different communication protocols that the memory device uses to communicate with the one or more external devices.

The memory device may be configured to use a U.2 connector for coupling to the one or more external devices.

The configurable bit or the mode select pin may be configurable at a pin of the U.2 connector.

The U.2 connector may include two pins that can be reconfigured to receive either SMBus protocol or Controller Area Network (CAN) protocol communications.

The mode select pin may include a vendor reserved pin.

The configurable bit may be configured to be set during self-configuration by the memory device.

The memory device may be configurable to communicate with the one or more external devices via a mid-plane.

According to some embodiments, there is provided a memory system that includes one or more external devices, and a memory device configured to communicate with the one or more external devices, and including a configurable bit or a mode select pin for determining which one of two or more different communication protocols is used between the memory device and the one or more external devices, wherein the two or more different communications protocols include at least a Controller Area Network (CAN) protocol and a System Management Bus (SMBus) protocol.

The memory device may include an Ethernet solid state drive (eSSD).

The memory device may further include a multiplexer (MUX) that is configured to be controlled by the mode select pin to select which one of the two or more different communication protocols that the memory device uses to communicate with the one or more external devices.

The memory system may further include a U.2 connector coupled to the memory device and coupled to the one or more external devices.

The configurable bit or the mode select pin may be configurable at a pin of the U.2 connector.

The mode select pin may include a vendor reserved pin.

The U.2 connector may include two pins that can be reconfigured to receive either SMBus protocol or Controller Area Network (CAN) protocol communications.

The configurable bit may be configured to be set during self-configuration by the memory device.

The memory system may further include a mid-plane between the memory device and the one or more external devices to enable the memory device to communicate with the one or more external devices.

According to some embodiments, there is provided a method of selecting one of at least two different communication protocols to be used by a memory device to communicate with an external device, the method including selecting a mode by providing a voltage to a mode select pin of the memory device or by configuring a bit of the memory device, and communicating with the external device according to the selected mode via pins of the memory device.

Selecting the mode may include selecting a special mode to use CAN for the communication protocol, and performing CAN communication between the memory device and the other electronic device using SMBus pins as the pins of the memory device.

Accordingly, because the memory device includes a mode select pin for toggling between communication protocols, the memory device is able to effectively communicate in an automobile environment while ensuring that important real-time communication is not interrupted.

BRIEF DESCRIPTION OF THE DRAWINGS

Some embodiments can be understood in more detail from the following description taken in conjunction with the accompanying drawings, in which.

DETAILED DESCRIPTION

Figure 1:
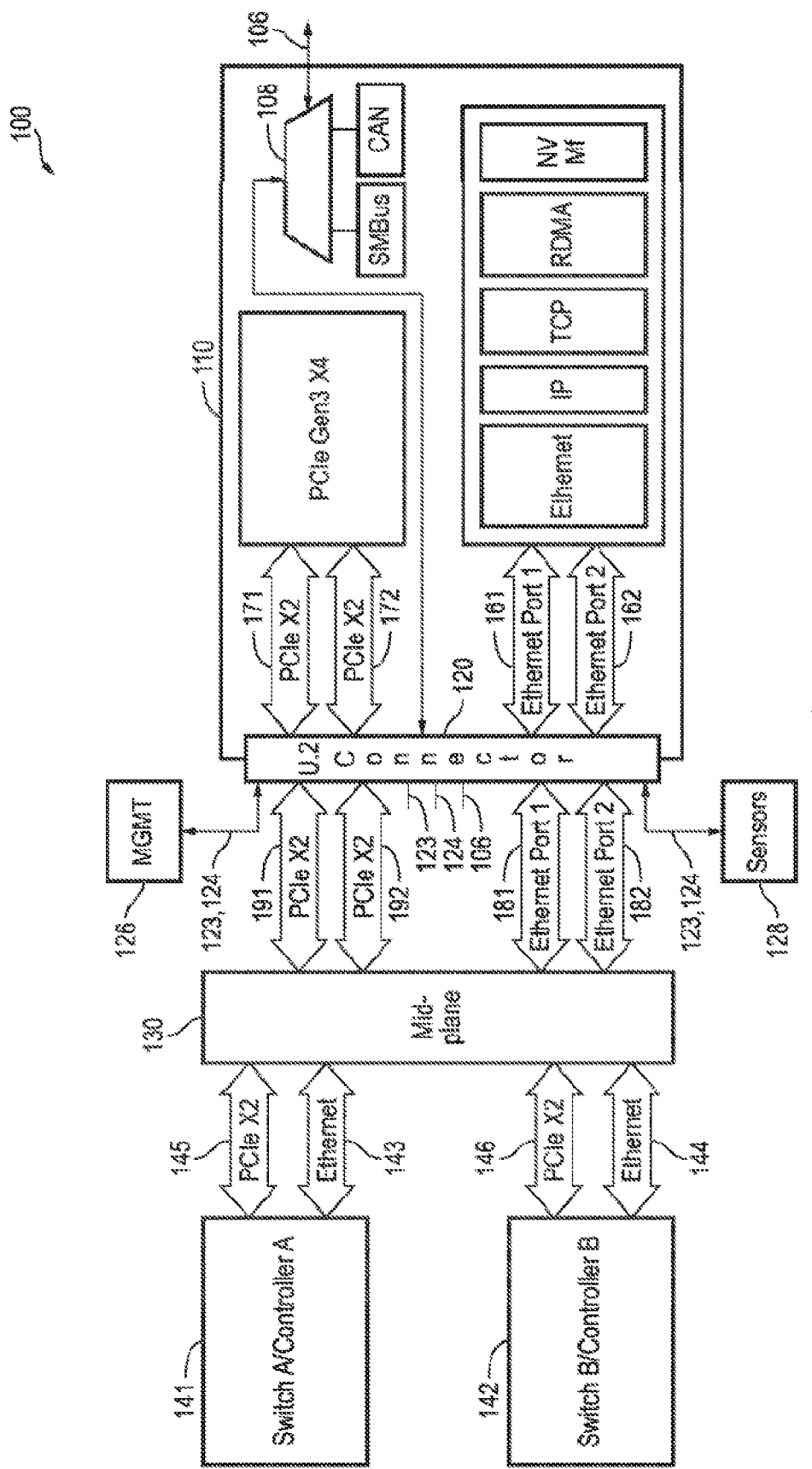
FIG. 1 is a block diagram of a memory system, which includes a memory device according to an embodiment of the present invention.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Previously, in automobile environments, communications bandwidth of about one megabit per second (1 mbps) has been sufficient. However, as automobiles become "smarter," more analytical, and more interconnected, the data traffic (e.g., for autonomous vehicles) may use a greater amount of bandwidth. Ethernet from a U.2 connector, or U.2 receptacle, can run ten gigabits per second (10 gbps) or more over standard U.2 connector pins. Accordingly, by using Ethernet, significant amounts of video data, sensor information, etc. may be moved between devices. However, using Ethernet to monitor eSSD status might not suffice in an automobile environment.

Further, although system network communication using system management bus (SMBus) technology may be ineffective at distances involved in an automobile environment, a Controller Area Network (CAN) communication protocol, which is a relatively common interface, may be an effective substitute. Accordingly, for manageability, status information, etc., a central computer/processor (e.g., inside a vehicle) may determine the status of an eSSD, and may communicate through CAN.

For certain applications, communications involving a non-volatile memory over Fabrics (NVMe-oF) device or an Ethernet SSD (eSSD) may have life-threatening implications, such as a situation where an autonomous automobile requires relatively immediate communication between the vehicles' sensors and the vehicles' actuators (e.g., brakes). That is, in real-time, it may be undesirable for a communications interruption to occur, because the ongoing communications may be in response to a sensor indicating that braking or other evasive maneuvering should be commanded by the vehicle's central processing to avoid a potential accident.

Additionally, communication with an eSSD may be accomplished by communication between the eSSD and a mid-plane. In traditional memory storage for information technology (IT) applications, or for cloud computing, a majority of the memory devices used therein would be connected to a drive bay. However, the drive bay would be implemented with a mid-plane or back plane, which would have numerous connections with a motherboard to accomplish computing and processing, thereby increasing latency within the network. Such latency may be undesirable if used, for example, in an autonomous automobile, as speed of communication in the network may be of importance to ensure proper operation of the vehicle (e.g., collision avoidance).

Accordingly, a programmable multi-mode eSSD may be effectively used as a memory storage device inside an automobile by using CAN. Furthermore, CAN may be a suitable communication protocol in such an environment. As described below, embodiments of the present disclosure may use two pins of an NVMe-oF device for communicating with an external device using either SMBus communication or CAN. Embodiments also may use a third pin of an NVMe-oF device to selectively switch between communication protocols (e.g., between a SMBus mode and a CAN mode) to enable communication between the NVMe-oF device and the external system. Additionally, embodiments of the present disclosure may retrofit existing infrastructure of a memory device to enable communication (e.g., status monitoring) with the memory device using multiple different communication protocols.

To summarize, Ethernet is a good fit for enabling communication in automobile and aerospace environments. Unfortunately, most widely used SSDs use SMBus for manageability, which is acceptable for communications occurring over short distances. SMBus technology, however, does not work ideally in automobile and aerospace environments due to communications in such environments occurring over much longer distances, and due to extreme harsh environmental operating conditions. Contrastingly, a CAN bus for performing CAN communications provides a good alternative in automobile and aerospace environments. Thus, the automobile and aerospace industries may be improved by utilizing Ethernet SSDs having a CAN bus that is used for manageability according to embodiments of the present disclosure described below.

Accordingly, embodiments of the present disclosure may use the CAN protocol as a low cost method for performing manageability (e.g., to check sensors, etc.), and may additionally allow for monitor smart information regarding of the drive using a SMBus protocol without disrupting real-time critical information. Further, embodiments of the present disclosure provide an approach for market adoption by the automobile and aerospace industries by providing CAN interface support to NVMe-oF SSDs.

Figure 2:
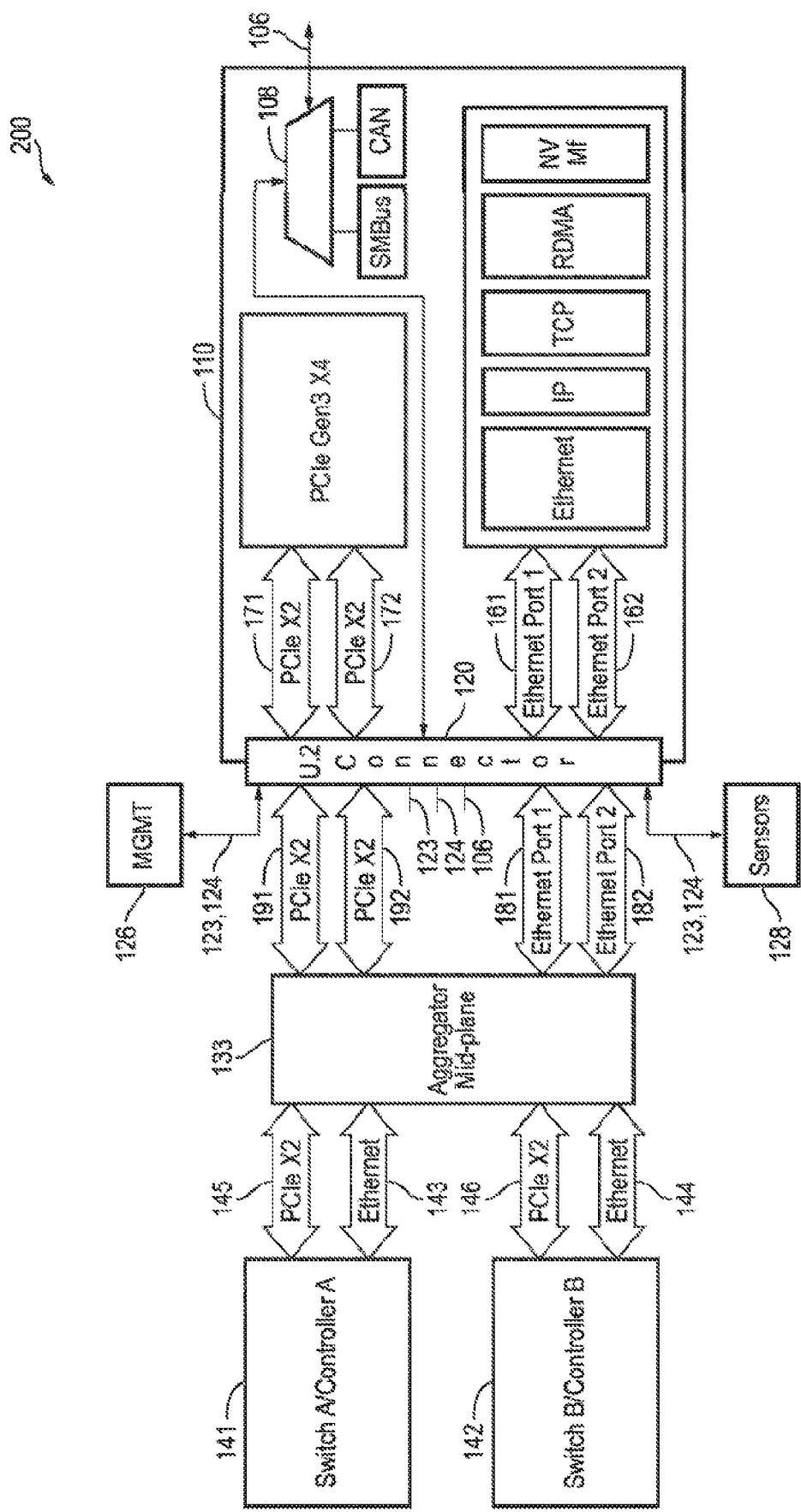
FIG. 2 is a block diagram of a memory system, which includes a memory device according to another embodiment of the present invention.

FIG. 1 is a block diagram of a memory system, which includes a memory device according to an embodiment of the present invention, and FIG. 2 is a block diagram of a memory system, which includes a memory device according to another embodiment of the present invention.

Referring to FIGS. 1 and 2, a memory system 100 including an NVMe-oF device (e.g., an NVMe-oF SSD or an eSSD) 110 for implementing an embodiment of the present disclosure is shown. Non-Volatile Memory Express (NVMe) and NVMe over fabrics (NVMEof) protocols allow software to communicate over Ethernet, and also to communicate with new versions of Peripheral Component Interconnect Express (PCI-e) SSDs (e.g., by communicating through a U.2 connector, described below). PCI-e is a high-speed serial computer expansion bus standard, and is the successor technology to Advanced Host Controller Interface (AHCI) technology, which enables communication with Serial AT Attachment (SATA) devices. Accordingly, NVMe technology allows U.2, M.2, or PCI-Express SSDs to improve performance over SATA devices while drawing less power.

The NVMe-oF device 110 of the present embodiment includes a connector (e.g., a U.2 connector 120, although other types of connectors may be used). The U.2 connector 120 enables communication of the NVMe-oF device 110 with a mid-plane 130, thereby enabling communication with one or more switches or controllers 141, 142. Previously, NVMe and NVMEof devices allowed only SMBus communications over U.2 connectors, but would not allow CAN communications over the same connectors. The NVMe-oF device 110 of the present invention, however, repurposes existing pins 123, 124 on the connector 120 to enable the NVMe-oF device 110 to communicate via either CAN or SMBus, as will be described below.

The NVMe-oF device 110 may communicate across the U.2 connector 120 on the NVMe-oF device 110 via one or more internal Ethernet ports 161,162 (e.g., Ethernet ports that are internal to the NVMe-oF device 110) for respectively communicating with the one or more controllers 141, 142, which are across the mid-plane 130 from the NVMe-oF device 110. Also, the NVMe-oF device 110 may communicate with the U.2 connector 120 via one or more internal links 171, 172 (e.g., by using PCI-e X2 links that are internal to the NVMe-oF device 110, and that are connected to a host of the NVMe-oF device 110) for respectively communicating with the one or more controllers 141, 142.

Further, to enable the NVMe-oF device 110 to communicate with the one or more controllers 141, 142, the NVMe-oF device 110 may communicate through the U.2 connector 120 and the mid-plane 130 via one or more external Ethernet ports 181, 182 (e.g., Ethernet ports that are external to the NVMe-oF device 110), which respectively correspond to the internal Ethernet ports 161, 162. Accordingly, the external Ethernet ports 181, 182 may connect to the NVMe-oF device 110 via connection to the internal Ethernet ports 161, 162. The U.2 connector 120 may also communicate across the mid-plane 130 via one or more external links (e.g., external PCI-e X2 links 191, 192 that are external to the NVMe-oF device 110).

Accordingly, as described above, the NVMe-oF device 110 may send/receive communication signals across the mid-plane 130 to/from the one or more controllers 141, 142 using either PCI-e or Ethernet technology by routing communications through the U.2 connector 120 located on the NVMe-oF device 110.

For example, the Ethernet communication between the NVMe-oF device 110 and the mid-plane 130 may be accomplished via SAS pins (i.e., Serial Attached SCSI (Small Computer System Interface) pins). Accordingly, the NVMe-oF device 110, which may be an eSSD, may plug into a slot on the mid-plane that is connects to the U.2 connector 120, to enable communication between the NVMe-oF device 110 and the mid-plane 130. Furthermore, the external PCI-e X2 links 191, 192 may also enable communication between the mid-plane 130 and the NVMe-oF device 110 in some modes.

The mid-plane 130 may communicate with the one or more controllers 141, 142 via one or more Ethernet connections 143, 144 respectively corresponding to the external Ethernet ports 181, 182, or via one or more PCI-e links 145, 146 respectively corresponding to the external PCI-e X2 links 191, 192 (e.g., one Ethernet connection and one PCI-e link corresponding to each of the controllers 141, 142). For example, one of the Ethernet connections 143 may be used as a data path, and another of the Ethernet connections 144 may be used as a control path, or may be used for manageability of the NVMe-oF device 110.

Furthermore, the NVMe-oF device 110 can communicate with one or more management components 126 or with one or more sensors 128 or other controllers. The NVMe-oF device 110 may perform such communications through the U.2 connector 120 via preexisting pins 123 and 124. Although the SMBus protocol may be used to communicate with management components 126, the NVMe-oF device 110 may also use the CAN protocol to communicate with the sensors 128 or other controllers via a CAN bus through the U.2 connector.

It should be noted that, although the present embodiment depicts communication with the mid-plane 130 whether the CAN protocol is enabled or the SMBus mode is enabled, in other embodiments, the external Ethernet ports 181, 182, and the external PCI-e lanes 191 and 192 may bypass or not otherwise use a mid-plane 130 (e.g., in a car environment, when CAN communication is used and a mid-plane is not present, as shown in the memory system 200 of FIG. 2) according to space and networking limitations of the corresponding environment in which the embodiment is applied. Thus, an eSSD according to this invention may be used in an automotive environment just as easily as it may be used in a datacenter environment.

As can be seen in FIG. 2, when the mid-plane 130 is omitted, the PCI-e links 145, 146 and the Ethernet connections 143, 144 can also be omitted, and can be replaced by a lightweight, aggregator mid-plane 133. The aggregator mid-plane 133 is different from the mid-plane 130 of the embodiment shown in FIG. 1, in that the aggregator mid-plane 133 has more limited fan-out capabilities/has a fewer number of inputs that can be connected to a specified output. For example, unlike the mid-plane 130 of the embodiment of FIG. 1, which may be used in datacenters to enable transfer of large amounts of data to a large number of individual devices, the aggregator mid-plane 133 of the embodiment shown in FIG. 2 may be a relatively small, even as small as a simple physical adapter. That is, the aggregator mid-plane 133 can effectively serve to get all of the Ethernet and PCI-e physical connections into the proper U.2 pins for the device. In some embodiments of the present disclosure, a simple, small ASIC would suffice to run the aggregator mid-plane 133 to thereby enable communication. Accordingly, the one or more controllers 141, 142 can be connected directly to the U.2 Connector 120 via the external PCI-e X2 links 191, 192 and the external Ethernet ports 181, 182.

It should be noted that, in other embodiments, both the mid-plane 130 and the aggregator mid-plane may be entirely absent (e.g., when only connecting a single eSSD of the NVMe device 110 to a single external device, such as a first controller 141 of the controllers).

Furthermore, as with the embodiment shown in FIG. 1, the NVMe-oF device 110 can communicate with management components 126 and sensors 128 or other controllers via preexisting pins 123 and 124 on the U.2 connector 120 using either the SMBus protocol or the CAN protocol. In the present embodiment, the NVMe-oF device 110 can communicate with the management components 126 using the SMBus protocol, and can communicate with the sensors 128 using the CAN protocol. For example, one of the pins 123 may be used for sending transmissions to the management components 126 or sensors 128, while another one of the pins 124 may be used for receiving transmission from the management components 126 or sensors 128.

The NVMe-oF device 110 of the embodiments shown in FIGS. 1 and 2 further includes a configurable mode select pin/a configurable bit 106 to select whether the device operates using an SMBus management protocol or a CAN protocol. The mode select pin/configurable bit 106 may be a pin of the U.2 connector 120. Accordingly, the NVMe-oF device 110 can select to communicate with the one or more controllers 141, 142 using either the CAN protocol or the SMBus protocol. The NVMe-oF device 110 may communicate using existing SMBus pins on the U.2 connector 123, 124 (e.g., pins E23 and E24) of the NVMe-oF device 110, which may have a 120-ohm cable that is connected thereto, and that is also connected to any CAN capable device (e.g., an electronic controller of an automobile to which the present embodiment is applied, which may be one of the controllers 141, 142 of the present embodiment). The mode select pin/configurable bit 106 may be a pin on the U.2 connector (e.g., pin E6, which is a vendor reserved pin, or pin S15 of the NVMe-oF device 110), or may be a configurable bit that may be set as part of VPD during device self-configuration. Accordingly, the same NVMe-oF device 110 can be used in automobile or aerospace applications, as well as in IT applications, without modification.

In the present embodiment, the NVMe-oF device 110 also includes a multiplexer (MUX) 108 that is controlled according to the mode select pin 106, such that the NVMe-oF device 110 may communicate with CAN or SMBus via pins 123, 124. Accordingly, the MUX 108 is connected to two or more different protocol engines, and based on a voltage provided to the mode select pin 106 (or based on a bit value of the corresponding configurable bit 106), the NVMe-oF device 110 communicates using either SMBus protocol or CAN protocol. In other embodiments, the MUX 108 may be omitted, and the NVMe-oF device 110 may use a dedicated SMBus channel as well as a dedicated CAN channel, thereby enabling the NVMe-oF device 110 to concurrently engage in both SMBus communication and CAN communication.

In one embodiment, the mode select pin 106 (which may be embodied as a configurable bit in other embodiments) may be set to low to be driven in a normal mode, whereby a SMBus communication protocol is implemented. When the mode select pin 106 is driven high, a special mode may be set to use the CAN protocol for communication between the NVMe-oF device 110 and an external device (e.g., one of the controllers 141, 142 or a computer/processor connected to the NVMe-oF device 110). Accordingly, in some embodiments, the two previously defined SMBus pins 123, 124 (e.g., SMBus pins E23 and E24) can be used for the CAN interface. That is, if the CAN mode is selected using the mode select pin 106, two previously defined SMBus pins 123, 124 can be used for the CAN interface (e.g., one pin 123 for transmitting (Tx) and the other pin 124 for receiving (Rx)).

According to the embodiments described above, an existing NVMe mid-plane 130 and existing connectors 120 may be used with the NVMe-oF device 110 without the need for redesign that may otherwise result from the addition of new pins. Further, the NVMe-oF device 110 can transfer data via Ethernet, via PCI-e X2, and via CAN for all standard features and applications, and effectively any SSD is able to communicate using CAN or SMBus. This may provide benefit in automotive embodiments due to the fact that the mid-plane 130 may be either omitted or greatly reduced in its capability. That is, the NVMe-oF device 110 in an automotive environment may omit the PCI-e lines 145, 146, 191, 192, and may choose to enable communication with the one or more controllers 141, 142 using only Ethernet. That is, in an embodiment of the present invention used in an automotive environment, the memory drive of the NVMe-oF device 110 (e.g., an eSSD) can connect directly to the one or more controllers 141, 142 to communicate through Ethernet or through CAN, and can therefore interface directly with various automotive monitoring components through CAN communications.

Moreover, manufacturing costs may be lower per unit of the NVMe-oF device 110 due to economies of scale, as the same NVMe-oF device 110 can be used in the IT industry, in the automobile industry, or in the aerospace industry. That is, the versatility of the NVMe-oF device 110 enables use in multiple products/chassis, meaning that the NVMe-oF device 110 can be used in a datacenter with full featured controllers and mid-planes, and can also be used in cars having a minimalistic mid-plane of reduced capacity, or even having no mid-plane at all. Further still, the NVMe-oF device 110 may use a standard interface (e.g., connector 120), and may use a SMBus that is reserved for managerial duty. Furthermore, embodiments of the present disclosure may be implemented using a field programmable gate array (FPGA), thereby enabling specialty computing based on a corresponding microchip, and the performance of the CPU may be changed depending on the application.

Accordingly, storage devices employing the disclosed embodiments can be used in IT as well as both the automotive and aerospace industries. According to the described embodiments, a standard NVMe Over Fabrics SSD may be retrofitted to support the automobile industry by providing Controller Area Network (CAN) support on standard U.2 connector. By using a mode select pin for toggling between communication protocols, the memory device is able to effectively communicate in an automobile environment while ensuring that important real-time communication is not interrupted.

The foregoing is illustrative of some embodiments and is not to be construed as limiting thereof. Although a few some embodiments have been described, those skilled in the art will readily appreciate that many modifications are possible in the some embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various some embodiments and is not to be construed as limited to the specific some embodiments disclosed, and that modifications to the disclosed some embodiments, as well as other some embodiments, are intended to be included within the scope of the appended claims and their functional equivalents.

What is claimed is:

1. A memory device configured to perform a first communication with a sensor using a first communication protocol, and to perform a second communication with a management component using a second communication protocol,
wherein the first communication and the second communication occur concurrently such that the first communication overlaps the second communication at least during a period of time.

2. The memory device of claim 1, wherein the first communication protocol is a Controller Area Network protocol, and the second communication protocol is a System Management Bus protocol.

3. The memory device of claim 1, wherein the memory device further comprises an NVMe solid state drive or a non-volatile memory over Fabrics device.

4. The memory device of claim 1, further comprising a mode select module for setting, based at least in part on instructions received by the mode select module, the memory device to operate in one of a first mode or a second mode.

5. The memory device of claim 4, wherein the second communication protocol comprises a PCIe protocol.

6. The memory device of claim 5, wherein the memory device is configured to use a U.2 connector, a M.2 connector, or a M.3 connector.

7. The memory device of claim 6, wherein the memory device is configured to use the U.2 connector.

8. The memory device of claim 1, wherein the memory device is configurable to communicate with the sensor or the management component via a mid-plane.

9. A memory system comprising:
a sensor;
a management component; and
a memory device configured to perform a first communication with the sensor using a first communication protocol, and to perform a second communication with the management component using a second communication protocol,
wherein the first communication and the second communication occur concurrently such that the first communication overlaps the second communication at least during a period of time.

10. The memory system of claim 9, wherein the first communication protocol is a Controller Area Network protocol, and the second communication protocol is a System Management Bus protocol.

11. The memory system of claim 9, wherein the memory device comprises an NVMe solid state drive or a non-volatile memory over Fabrics device.

12. The memory system of claim 9, wherein the memory device comprises a mode select module for setting, based at least in part on instructions received by the mode select module, the memory device to operate in one of a first mode or a second mode.

13. The memory system of claim 12, wherein the second communication protocol comprises a PCIe protocol.

14. The memory system of claim 13, further comprising a U.2 connector, a M.2 connector, or a M.3 connector.

15. The memory system of claim 14, wherein the memory device is coupled to the U.2 connector.

16. The memory system of claim 14, wherein the memory device is coupled to the U.2 connector, and wherein the U.2 connector includes two modules that can be reconfigured to receive either System Management Bus protocol or Controller Area Network protocol communications.

17. The memory system of claim 9, further comprising a mid-plane between the memory device and the sensor or the management component to enable the memory device to communicate with the sensor or the management component.

18. A method of communication by a memory device, the method comprising:
   communicating in a first communication with a sensor using a first communication protocol; and
   communicating in a second communication with a management component using a second communication protocol,
   wherein the first communication and the second communication occur concurrently such that the first communication overlaps the second communication at least during a period of time.

19. The method of claim 18, further comprising setting a mode by providing a voltage to a mode select module of the memory device; and
   performing the first communication or the second communication according to the set mode via modules of the memory device.

20. The method of claim 19, wherein the setting the mode comprises setting a special mode to use a Controller Area Network protocol as the first communication protocol, and
   wherein the communicating in the first communication comprises performing CAN communication between the memory device and the sensor using System Management Bus modules of the memory device.

\* \* \* \* \*